June 17, 1952      F. ERNEST      2,600,745

PISTON RING

Original Filed Nov. 24, 1945

FRED ERNEST,
INVENTOR.

BY John Flann
ATTORNEY.

Patented June 17, 1952

2,600,745

UNITED STATES PATENT OFFICE 2,600,745

PISTON RING

Fred Ernest, Los Angeles, Calif., assignor to
Guy H. Hall, Los Angeles, Calif.

Original application November 24, 1945, Serial No. 630,629, now Patent No. 2,551,878, dated May 8, 1951. Divided and this application October 23, 1950, Serial No. 191,690

4 Claims. (Cl. 309—44)

This invention relates to piston rings, and especially to such rings as are adapted to be used in internal combustion engines.

This application is a division of an application filed on November 24, 1945, under Serial No. 630,629, now Patent No. 2,551,878, May 8, 1951, and entitled "Piston Ring."

Piston rings employed in such engines often accumulate carbon; and, when used as an oil ring, the oil passages connecting the interior of the piston with the ring channel may be clogged with a carbon deposit. The accretion of carbon may be prevented by the aid of an auxiliary floater or scavenger ring, operating in an annular recess formed in the main ring, and having limited freedom of movement in a direction axially of the ring. Such a structure is illustrated and described in said prior application.

It is one of the objects of this invention to provide other forms of such piston rings, and especially by the aid of tapered surfaces that improve the capability of the ring to reduce accretion of carbon even upon continued wear of the ring.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

Figure 1:
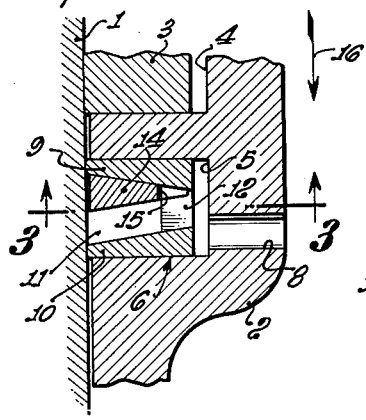
Figure 1 is a fragmentary sectional view, illustrating a ring structure incorporating the invention.
Figure 2:
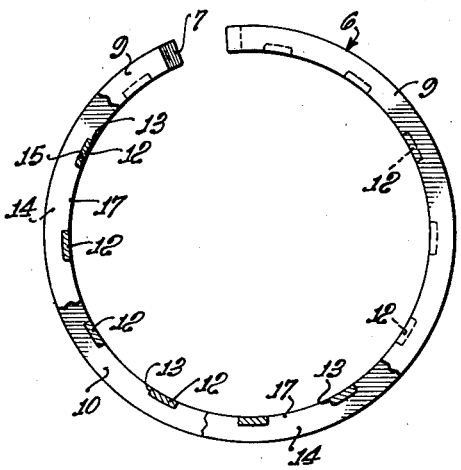
Fig. 2 is a horizontal sectional view of a complete ring assembly, portions of the structure being broken away.
Figure 3:
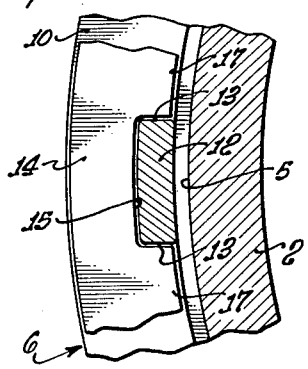
Fig. 3 is a sectional view, taken along a plane corresponding to line 3—3 of Fig. 1.
Figure 4:
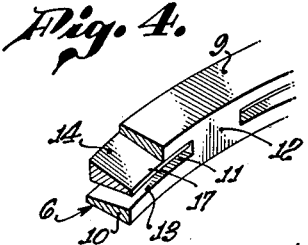
Fig. 4 is a pictorial view of a portion of the ring structure shown in Fig. 1.

A fragmentary portion of a cylinder wall 1 and a corresponding piston 2 are illustrated in Fig. 1. Contacting the cylinder wall 1 is an expanding ring 3, disposed in a groove 4 in the periphery of the piston 2. This ring may be of the usual compression type, having ends that permit it to expand into contact with the wall 1.

Below groove 4 there is another groove 5. In this groove 5 a piston ring structure is shown, including a main piston ring member 6 (Figs. 1, 2, 3, and 4). This main piston ring member is preferably formed of cast iron, and slit, as indicated by reference character 7 in Fig. 2, in order to permit expansion of the ring into contact with the wall 1. The recess or groove 5 communicates with oil passages 8 in piston 2, leading to the interior thereof.

The main ring member 6 is provided with an upper flange 9 and lower flange 10 defining a groove 11. These flanges 9 and 10 are joined together by a series of spaced posts or struts 12 defining slots 13. Furthermore, the flanges 9 and 10 slope, or are tapered, to cause the groove 11 to diverge toward the periphery of the ring structure 6 (see Fig. 4).

Disposed in the groove or recess 11 is an auxiliary or supplemental ring member 14. This ring member 14 is symmetrically tapered to form top and bottom surfaces that diverge toward the periphery of the ring structure 6. The ring member 14 is also provided with recesses 15 (Fig. 3), forming intervening projections 17 disposed in slots 13 formed between the posts or struts 12.

The width of the ring 14 is substantially less than the width of the groove 11. Accordingly, when the piston 2 moves downwardly in the direction of the arrow 16 (Fig. 1), the supplemental ring 14 contacts the upper flange 9. When the piston 2 reverses its movement, the supplemental ring 14 is caused to contact the lower flange 10. This relative movement, permitted by the clearance between the flanges 9 and 10, prevents the accretion of carbon. Furthermore, since the ring member 14 has projections 17 entering into the slots 13 defined by the posts 12, these slots that form the oil passages are likewise free of carbon.

Preferably, the ring member 14 may be made of steel, or the like, expanding outwardly into contact with the cylinder wall 1.

Figure 5:
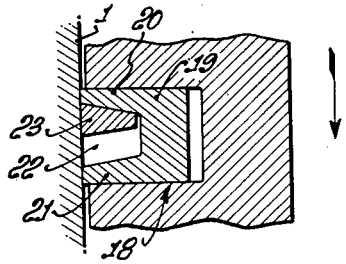

In the form shown in Figs. 1 to 4, inclusive, the ring structure is adapted to be used as an oil ring. In the form shown in Fig. 5, the ring structure 18 is formed in a similar manner, but is intended for use as a compression ring. This ring structure includes the main ring member 19, having flanges 20 and 21 defining an uninterrupted groove or recess 22. This groove 22 has an outward taper similar to that of groove 11 in Fig. 1.

The auxiliary ring member 23 is similar to ring member 14, except that since there are no slots or openings in ring member 19, and, therefore, there are no inwardly directed projections on member 23.

Figure 6:
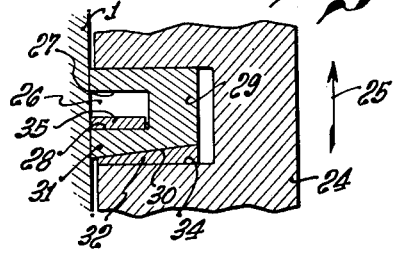
Figs. 5 and 6 are views, similar to Fig. 1, of modified forms of the invention.

In the form shown in Fig. 6, the piston 24 is shown as moving upwardly, as indicated by arrow 25. The main piston ring 29 has a recess or groove 26 with parallel upper and lower flanges 27 and 28. The main ring member 29 has a lower external surface 30 that slopes, the sloping being such that the thickness of the lower flange 31 increases as the periphery of the piston 24 is approached. A spacer ring 32 is interposed between the surface 30 and the piston groove surface 34, and is so shaped as to be in contact with both of these surfaces.

In this way, it is assured that there can be an outward force constantly urging ring 29 against the cylindrical surface 1, in spite of wear on the rings. A supplemental ring 35 is located in the recess 26. It operates in the same manner as the supplemental ring 14 of Fig. 1.

The inventor claims:

1. In a piston ring structure: a ring having a body portion and a flange extending from the body portion forming a recess; said ring also having an end surface defining with one side of the ring groove of the piston a tapered annular space, the small portion of the tapered space being at the outer periphery of the ring groove; a supplemental ring in said recess and substantially less in width than the recess; and a tapered ring in contact with the groove and the end surface.

2. In a piston ring structure: a ring having a body portion adapted to fit into a ring groove in a piston; flanges at opposite ends of the body portion defining an annular recess; the opposed flange surfaces forming the sides of the recess being tapered to form a space diverging toward the periphery of the piston; and a supplemental ring having tapered surfaces capable of contacting with the sides of the recess, and substantially less in width than the recess.

3. In a piston ring structure: a ring having a body portion and a flange extending from the body portion, said flange having an end surface defining with one side of the ring groove a tapered annular space, the small portion of the tapered space being at the outer periphery of the ring groove; and a tapered ring in contact with the groove and the end surface.

4. In a piston ring structure: a ring having a body portion adapted to fit into a ring groove in a piston; flanges at opposite ends of the body portion defining an annular recess; the opposed flange surfaces forming the sides of the recess being tapered to form a space diverging toward the periphery of the piston; and a supplemental ring having tapered surfaces capable of contacting with the sides of the recess, and substantially less in width than the recess; said tapered surfaces of the supplemental ring being symmetrically diverging toward the periphery of the piston.

FRED ERNEST.

REFERENCES CITED

The following references are of record in the file of this patent:

UNITED STATES PATENTS

| Number | Name | Date |
|---|---|---|
| 1,298,548 | Mummert et al. | Mar. 25, 1919 |
| 1,951,959 | Alexandrescu | Mar. 20, 1934 |
| 2,443,065 | Bowers | June 8, 1948 |

FOREIGN PATENTS

| Number | Country | Date |
|---|---|---|
| 475,698 | Great Britain | of 1937 |
| 736,271 | France | of 1932 |